United States Patent [19]

Quirk et al.

[11] Patent Number: 5,569,312

[45] Date of Patent: Oct. 29, 1996

[54] METHOD FOR REDUCING $NO_x$ EMISSIONS FROM A REGENERATIVE GLASS FURNACE

[75] Inventors: Richard Quirk, Aughton; David A. Bird, Rufford; Ian N. W. Shulver, Southport; Robin M. McIntosh, Newburgh, all of United Kingdom

[73] Assignee: Pilkington Glass Limited, United Kingdom

[21] Appl. No.: 153,986

[22] Filed: Nov. 18, 1993

[30] Foreign Application Priority Data

Nov. 27, 1992 [GB] United Kingdom ............... 9224852

[51] Int. Cl.⁶ .................................................. C03B 5/167
[52] U.S. Cl. ............................. 65/134.6; 431/5; 110/210; 110/212; 110/214
[58] Field of Search ..................... 65/134.6, 347, 65/134.4; 423/235, 246, 236, 245.3; 431/10, 5; 110/214, 212, 210, 211

[56] References Cited

U.S. PATENT DOCUMENTS

| | | | |
|---|---|---|---|
| 3,856,496 | 12/1974 | Nesbitt et al. | 65/134.6 |
| 3,873,671 | 3/1975 | Reed et al. | 423/246 |
| 4,328,020 | 5/1982 | Hughes . | |
| 4,347,072 | 8/1982 | Nagaoka et al. . | |
| 4,372,770 | 2/1983 | Krumwiede et al. | 65/27 |
| 4,528,012 | 7/1985 | Sturgill | 65/134.6 |
| 4,559,100 | 12/1985 | Ninomiya et al. | 156/345 |
| 4,599,100 | 7/1986 | Demarest, Jr. | 65/134.4 |
| 4,878,830 | 11/1989 | Henderson | 431/10 |
| 5,085,156 | 2/1992 | Dykema | 431/10 |
| 5,417,731 | 5/1995 | LeBlanc et al. | 65/134.4 |

FOREIGN PATENT DOCUMENTS

| | | |
|---|---|---|
| 2510423 | 2/1983 | France . |
| 53-8361 | 1/1978 | Japan ............... B01D 53/34 |
| 54-029317 | 3/1979 | Japan . |
| 54-038268 | 3/1979 | Japan . |
| 55-154327 | 12/1980 | Japan . |

OTHER PUBLICATIONS

"Furnace Emission Challenge to French Glassmakers," *Glass*, Apr. 1993, pp. 137–140.

*Primary Examiner*—Donald E. Czaja
*Assistant Examiner*—Steven P. Griffin
*Attorney, Agent, or Firm*—Howrey & Simon

[57] ABSTRACT

A method of operating a cross-fired regenerative glass furnace for melting flat glass so as to minimize emission of NOx in waste gases leaving the furnace, the furnace having sealed regenerators which act as heat exchangers, the method comprising supplying fuel in excess of that required for stoichiometric combustion to ensure that glass of the required quality at the required production rate is obtained, and that the waste gases leaving the furnace through the regenerators contain combustible material, and reacting the combustible material with sufficient air to ensure that the waste gases exiting to atmosphere contain permissible levels of combustible material and permissible levels of NOx. Alternatively, the furnace may be operated at substantially stoichiometric conditions and fuel is supplied to the waste gases as they leave the melting chamber. The invention also relates to a cross-fired regenerator glass furnace for use in the method. The invention further provides a method of reducing the emissions of CO in waste gases leaving a cross-fired regenerative glass furnace for melting flat glass, the furnace having sealed regenerators which act as heat exchangers, the method comprising removing CO from the waste gases in the regenerator by combusting CO in around 8% excess air, based on the combustion air for the supplied fuel, at a temperature greater than 650° C.

11 Claims, 4 Drawing Sheets

METHOD FOR REDUCING NO$_x$ EMISSIONS FROM A REGENERATIVE GLASS FURNACE

BACKGROUND OF THE INVENTION

1. Field of the Invention

This invention relates to a method of reducing the NOx content in the waste gases leaving the regenerators of a cross-fired regenerative furnace used for melting glass. NOx is a shorthand designation of oxides of nitrogen such as NO and NO$_2$.

2. Discussion of the Prior Art

It has long been known that a fuel burner operating substoichiometrically (i.e. at an air:fuel ratio less than that necessary to effect complete combustion) will produce less NOx than when operating with stoichiometric conditions, and burners designed to operate in that manner are described e.g. in U.S. Pat. No. 4,878,830 which also reviews the prior art in this field. JP-A-53-8361 (Examined 48134/84) describes a method of operating a glass furnace using afterburners, to introduce additional fuel into the furnace in the vicinity of a port, regenerator, heat exchange chamber or flue. U.S. Pat. No. 4,347,072 discusses this specification and points to problems in operating a glass furnace in the manner described in JP-A-55-8361. U.S. Pat. No. 4,347,072 describes an alternative method of operating by supplying hydrocarbons into the waste gases from fuel combustion above the glass melt and then burning this excess fuel in the furnace to provide heat energy to the melting process.

It has always been considered that operating a glass furnace with the melting conditions reducing, i.e. substoichiometric, would produce glass of poor quality.

U.S. Pat. No. 4,559,100 in the name of the major glass maker PPG describes a process where the conditions in the vicinity of the melting glass are prevented from becoming substoichiometric so as to avoid producing poor quality glass. The process requires that additional fuel should be injected into the melting chamber at a flow rate and volume sufficient to provide an O$_2$ rich region above the glass and a fuel rich region thereabove, and to further provide relatively low overall excess air and at least substantially complete combustion by the time the combustion gases exit the melting chamber. Substoichiometric conditions clearly have occurred by chance from time to time in glass tanks and, as they have resulted in poor glass, have directed people away from operating continuously with reducing conditions in the furnace.

We have now found that a reduction in the amount of NOx in the waste gases leaving a flue system of a glass melting tank can be achieved by ensuring that the waste gases leaving the furnace and entering the regenerator includes fuel which has not undergone complete combustion. All of the previous proposals to operate with non-stoichiometric conditions are concerned with the melting chamber, and ensuring that oxidizing conditions are maintained within the melting chamber at all times and where excess fuel is supplied, ensuring that it is burnt before it enters the regenerator system, or that as the fuel passes through the regenerator that conditions are consistently oxidizing. Our invention is based on the discovery that it is possible to minimize the amount of NOx in the exit flue gases from a regenerative glass melting tank by ensuring that there are combustibles present in the waste gases as they pass through the regenerators. This combustible material is a mixture of unburnt fuel, combustible material produced by the effect of heat on the fuel and other radicals produced in this pyrolysis. A part of this material is capable of reacting with NOx in the waste gases and converting it to harmless material. It is essential to operate with a sealed regenerator so that the ingress of air into the regenerators is such as to avoid uncontrolled combustion within the refractory packing or checkerwork structure, which reduces the effectiveness of the process of removal of NOx from the waste gases. In particular, the burners are sealed into the burner block/port neck refractories of the regenerators. It is ensured that there is no excess air in the checkerwork structure which would cause uncontrolled combustion of the fuel within the checkerwork structure which would damage the structure due to overheating. The combustible material is burnt by adding air preferably after it has left the checkerwork structure of the regenerator, or at points within the checkerwork, dependent on the temperature regime within the regenerator system.

SUMMARY OF THE INVENTION

According to the invention, there is provided a method of operating a cross-fired regenerative glass furnace for melting flat glass so as to minimize emission of NOx in waste gases leaving the furnace system, the furnace having sealed regenerators which act as heat exchangers, the method comprising supplying fuel in excess of that required for stoichiometric combustion to ensure that glass of the required quality at the required production rate is obtained, and that the waste gases leaving the furnace through the regenerators contain combustible material, and reacting said combustible material with sufficient air to ensure that the waste gases exiting to atmosphere contain permissible levels of combustible material and permissible levels of NOx. Preferably, the regenerators contain checkerwork structures.

One way of performing the invention (hereinafter referred to as "Type 1" operation) is to operate with substantially substoichiometric conditions within the melting area of the furnace by supplying excess fuel to the melting area and allowing combustible material to leave the furnace through the sealed regenerators mixed with the waste gases. In another form of the invention (hereinafter referred to as "Type 2" operation) the conditions within the melting furnace are operated with a limited amount of combustion air so as to be substantially stoichiometric and fuel is supplied to the waste gases as they leave the melting area and enter the sealed regenerator structure. In such an arrangement either excess air or excess fuel may be present in the melting furnace. This post furnace fuel is added by the existing burners or through additional separate fuel "burners" in the port mouth region. In both cases, air is added to the waste gases as they leave the checkerwork structure of the regenerators so as to remove substantially all the combustible material by burning it with the added air.

In a typical gas-fired glass melting furnace, the melting operation is carried out with around 5% excess air which typically produces a NOx content in the chimney exhaust gases of around 2500 mg/m$^3$. In this specification, references to concentrations (e.g. mg/m$^3$) are at TALuft conditions, i.e. at 8% O$_2$ measured dry, in a dry waste gas volume and NOx emissions are expressed as NO$_2$ emissions. Volumetric measurements are all specified at 760 mmHg and 0° C., and parts per million (ppm) are specified in volumetric terms, also under TALuft conditions. We have found that operating with reduced amounts of excess air than in known furnaces, i.e. using stoichiometric or substoichiometric conditions, not only is less NOx generated within the melting chamber but the residual fuel reduces NOx present to N$_2$ in the regenerators. This double effect causes a significant reduction in the amount of NOx released in the chimney exhaust gases. The present invention can achieve NOx chimney emissions of less than 500 mg/m$^3$.

We have found that despite the previous belief that operating a glass furnace or tank under substantially reducing conditions would result in poor quality glass, it is possible to operate with the amounts of fuel and combustion air supplied to the tank being such that the reaction conditions are substantially substoichiometric without adverse effects. We believe that this is only possible when there is very careful control of the stoichiometry within the furnace and where the substoichiometric conditions are produced by the use of excess fuel rather than insufficient air, or else insufficient energy is supplied to the melting process, and glass quality and/or production rate deteriorates. It is preferable to not only monitor the oxygen content at the exit port mouth, but also the quantity of unburnt combustible material at this position. It is necessary to ensure when the conditions in the furnace are substantially substoichiometric that sufficient fuel is being burnt to provide the quantity of heat needed to produce molten glass at a satisfactory rate, and quality.

In a further aspect of our invention, there is provided a method of reducing NOx content in waste gases generated by the combustion of fuel, in a cross-fired regenerative furnace having a plurality of ports spaced along opposite sides of a melting chamber, and arranged in co-operative pairs and having sealed regenerators, which method comprises measuring both combustibles and oxygen in the gases at at least one or more points in the melting chamber and regulating the supply of fuel and combustion air in response to such measurements to ensure that within the melting chamber, the average stoichiometry ratio is substantially below that required to effect complete combustion while ensuring that the part of the fuel actually combusted is not less than that dictated by the heat input requirements of the melting and refining processes which occur in the melting chamber and supplying additional combustion air to the waste gases after they have left the melting chamber (sometimes referred to as a melting and refining chamber) and before they exit to atmosphere to ensure substantially complete combustion of any combustibles remaining in the waste gases.

In order to produce glass of float quality in a consistent and a satisfactory manner, we find it preferable to maintain the combustion conditions within the melting and refining chamber so that as the molten glass leaves the chamber it is exposed to conditions at the last port which are less reducing/more oxidizing than the port upstream from the last port. By glass of float quality we mean a flat glass product with a Target Fault Density for faults greater than 0.5 mm diameter (at 4 mm substance): Bubble no more than 0.25 per 10 m$^2$; inclusions no more than 0.25 per 10 m$^2$.

One method of operating the invention is one in which the fuel and combustion air is regulated at each port so as to ensure that the stoichiometry measured along the melting and refining chamber from where batch is fed to where molten glass exits the furnace becomes less reducing/more oxidizing the nearer the point at which the molten glass exits the melting chamber. A preferred aspect of our invention is directed to a method of operating a glass melting furnace in which the substoichiometric conditions are produced by feeding a quantity of combustion air which at the first port is at least 10% less than that required for complete combustion of the combustible material fed to the furnace at that port, and rises to that or substantially that required for complete combustion at the last port.

As indicated above, another method of ensuring that combustible material passes through the regenerators with the waste gases is by supplying fuel to the waste gases as they leave through the port necks of the furnace. This can be done by placing fuel supply means at after burner positions. After burners may be placed in the path of the exiting waste gases. The fuel can be directed into the waste gases in the same direction of flow, or counter flow. After burners can be a separate means of supplying fuel into the waste gas stream, or the non-firing burners on the waste gas exit side of the furnace can be used to introduce fuel into the waste gas stream. The conditions within the melting and refining chamber are preferably maintained at or below stoichiometric, so as to avoid combusting more fuel than is needed for the NO$_x$ reduction process.

Secondary air is introduced at positions within the regenerator/flue system where temperatures allow ignition of the combustible species to complete combustion and ensure that gases exiting to atmosphere are substantially free of combustible materials. It is essential that the regenerator system is substantially sealed against the ingress of air, so that the introduction of secondary air can be controlled and combustion primarily only takes place outside the regenerator packing/checkerwork.

The quantity of combustible material and oxygen present at the exit port mouth can be measured in situ, or by extractive analysis using available instruments. Such instruments can include a zirconia probe to measure oxygen and a catalytic cell to measure combustibles. The Teledyne 980 gas analyzer is satisfactory for this purpose. NOx can be measured using a Lancom 6500 portable flue gas analyzer or a Signal chemiluminescence analyzer.

The present invention further provides a method of reducing the emissions of CO in waste gases leaving a cross-fired regenerative glass furnace for melting flat glass, the furnace having sealed regenerators which act as heat exchangers, the method comprising removing CO from the waste gases in the regenerator by combusting CO in, for example, around 8% excess air, based on the combustion air for the supplied fuel, at a temperature greater than 650° C.

The present invention still further provides a cross-fired regenerative glass furnace for melting flat glass, the furnace having sealed regenerators which contain checkerwork structures which act as heat exchangers, the furnace further having apparatus for reducing the emission of NOx in waste gases leaving the furnace, the apparatus comprising means for supplying additional fuel into the waste gases as they leave the melting chamber of the furnace whereby the NOx emissions in the chimney waste gases are reduced to less than 500 mg/m$^3$ measured under TALuft conditions.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
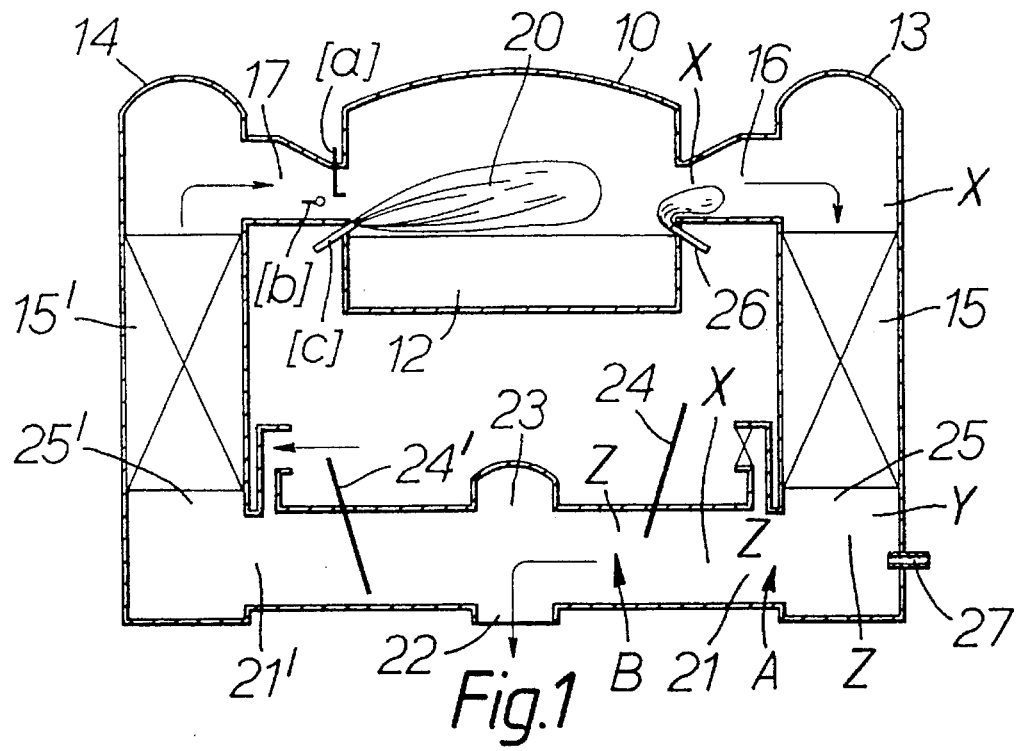
FIG. 1 is a diagrammatic cross-section of a cross-fired regenerative furnace in accordance with the invention.
Figure 2:
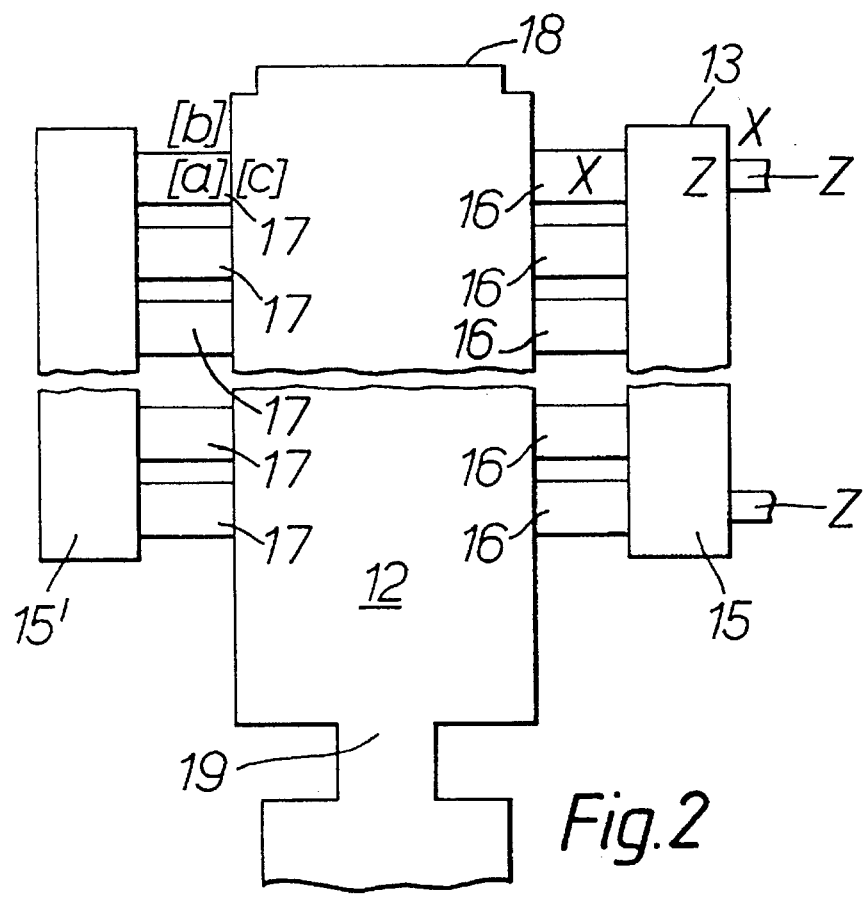
FIG. 2 is a diagrammatic transverse sectional plan of the furnace shown in FIG. 1.

FIGS. 1 and 2 show a typical cross-fired regenerative furnace 10, having a melting and refining chamber 12 provided on each side with sealed regenerators 13 and 14. Each regenerator has a refractory packing 15 and 15' in the form of a checkerwork structure, which is formed as a divided box regenerator. Each box section is connected to the melting chamber 12 by means of a port. These ports 16 and 17 are arranged along each side of the tank. The melting chamber is fed with glass making materials at one end 18, and molten glass leaves the melting area of the tank through a waist 19.

Heat is supplied to the melting chamber 12, by the combustion of natural gas consisting essentially of methane (though other fuels, gaseous (e.g. propane) or liquid (e.g. oil), can of course be used). During the first part of the combustion cycle, air passes from the regenerator 14 through port necks and ports 17 into the melting and refining chamber 12, while combustion products leave the tank through the ports and port necks 16 through the regenerator 13. The fuel for combustion is suppled by burners situated in the ports 17. There are various ways in which such burners can be mounted in the ports. Referring to FIG. 1 three possible configurations are illustrated, through-port (a), side-port (b) and under-port (c). Natural gas is fed from the burners (which in the present embodiment are under-port burners) into the incoming stream of pre-heated air coming from the regenerators 14 during the firing cycle, and the resultant flame and products of combustion produced in that flame pass from the ports 17 across the surface of the melting glass, and transfer heat to that glass in the melting and refining chamber 12. In the other part of the firing cycle, the arrangement is reversed, i.e. pre-heated combustion air flows from the regenerator 13 through the port necks and ports 16, and natural gas is fed to the burners mounted in the ports 16. In both parts of the firing cycle, waste gas generated by the combustion of the fuel supplied to the burners passes out of the base of the regenerators in the vicinity of the rider arches 25,25' to atmosphere via bridging flues 21, 21' and a chimney 22. The flue arrangement is a conventional side entry system with a central main flue 23 with sliding gate reversal valves 24,24'. Means to measure both combustibles and oxygen in the gases leaving the melting chamber 12 at each port mouth, and at the exits from the regenerators as well as at the base of the chimney, are provided. Measuring points along the path of the waste gas are indicated by in FIG. 1. The melting furnace is operated in a manner which means that uncombusted/partly combusted/pyrolyze material enters the regenerators so that means to add additional air to the waste gases after they leave the melting chamber are required to ensure substantially complete combustion has taken place and no or very little combustible material passes to the atmosphere through the chimney. Additional air may be supplied at in FIG. 1. Final combustion of any remaining combustibles is then caused to take place at the points indicated by. About 70% of the combustible material in the waste gases is carbon monoxide with the remainder being mainly hydrogen.

In operating the glass melting furnace shown in FIGS. 1 and 2 in accordance with one embodiment of the present invention (i.e. Type 1 operation), the fuel fed to the burners and the combustion air supplied is controlled by measuring at the port mouth and the top of the checkerwork structure (the checkertop) the quantity of oxygen and combustible material present so as to ensure that within the melting chamber 12 or at points along the melting chamber 12, the combustion air fed is less than that required for complete combustion of the fuel being supplied. It is normal to express any supply of combustion air which is greater than the stoichiometric air requirement of the fuel supplied as a percentage excess air, and in this situation this is a positive term. In the present instance where the amount of air is less than that required for complete combustion, for ease of control, we represent this in the same manner but as a negative term. This means that the changes in the amount of excess air can be monitored and reported in the same manner whether or not the amount of air fed is greater or less than that required for complete combustion. In one embodiment of the present invention, the fuel fed at each port and the amount of combustion air is regulated in accordance with the measurements made so that the quantity of excess air in the melting chamber of the furnace lies in the range of from −3% to −10% of stoichiometric combustion air, more preferably −8% to −10% of combustion air. For a multi-port furnace as illustrated, preferably the quantity of excess air from port to port rises from −15% at the first port to 0% at the last port. The quantity of air fed to the intervening ports between the first port and the last port, can be at the same level of −15%, or can fall in the stages to give an average of −9%.

Figure 3:
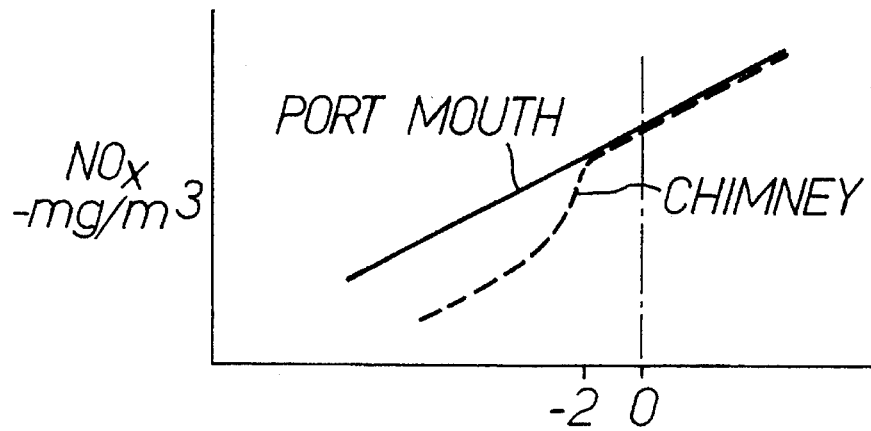
FIGS. 3 to 8 are graphs showing the variation of species in the waste gases, such as NOx and CO, with various operating parameters when employing the method and apparatus of the present invention.

FIG. 3 shows how the NOx emissions are related to the excess air level at the port mouths in the furnace, the NOx concentrations and the excess air values being weighted mean values for the furnace as a whole. The solid line represents the NOx concentration at the port mouth and the dashed line represents the NOx concentration in the chimney. It will be seen that at low amounts, below −2%, of excess air at the port mouth, the NOx concentration in the chimney is reduced relative to that in the port mouth and this indicates that NOx reduction has occurred in the regenerator, between the port mouth and the chimney. The de-NOx reaction has occured primarily in the checkerwork structure as a result of the excess fuel reducing the NOx species therein. The negative excess air value is equivalent to a correspondingly positive excess fuel value. For Type 1 operation, there should be a deficiency of air of at least 3% relative to stoichiometric, i.e. at most about −3% excess air, at the port mouth for initiation of the de-NOx reaction, this leading to around at most −3% excess air at the checkertop (the top of the checkerwork structure) which results in excess fuel in the checkerwork structure causing reduction of the NOx therein. At greater amounts of negative excess air, i.e. at greater deficiencies of excess air, we have found that some deNOx occurs in the upper chamber of the regenerator.

We have found for a multi-port furnace that as long as the last port is maintained at less reducing/more oxidizing conditions than the previous port there is no adverse effect on glass quality. The value chosen for the excess air level is related not only to the required emission limits of NOx but to the thermal penalty due to uncombusted material leaving the melting chamber and will vary with the configuration of the melting furnace being operated and the local requirements with regard to emissions. In some cases, it may well be possible to operate with excess air levels maintained on the upstream ports at the order of −4%, rising to about −1 to 0% at the last port. The monitoring on a regular basis of the waste gases (both oxygen and combustibles) enables the feed of both fuel and combustion air to be adjusted when necessary so as to maintain a tight control on the excess air at each port mouth thus avoiding any unacceptable increase in NOx emission or deterioration in glass quality. Optimum air and fuel levels for each port need to be established for each port in order to achieve the target emissions. This is because the precise amounts would depend on the particular characteristics of each port. For port by port optimization the NOx concentrations are measured at the bridging flue, with checks at the chimney using portable measuring equipment.

In Type 2 operation, the melting furnace is operated at substantially stoichiometric conditions, i.e. at around 0% excess air, and excess fuel is added to the waste gases outside the furnace chamber. This is a post-furnace combustion fuel addition. The fuel may conveniently be added by under port burners on the non-firing side, these being illustrated in FIG. 1 as burners 26. For efficiency and checkerwork safety, post furnace fuel should only be added when the port mouth excess air is close to stoichiometric, or more ideally substoichiometric. If excess air is present in the waste gases at the port mouth, some of the added fuel will be consumed causing the temperature of the waste gases in the upper chamber and checkerwork structure to rise, with a consequent increase in checkerwork temperature.

Figure 4:
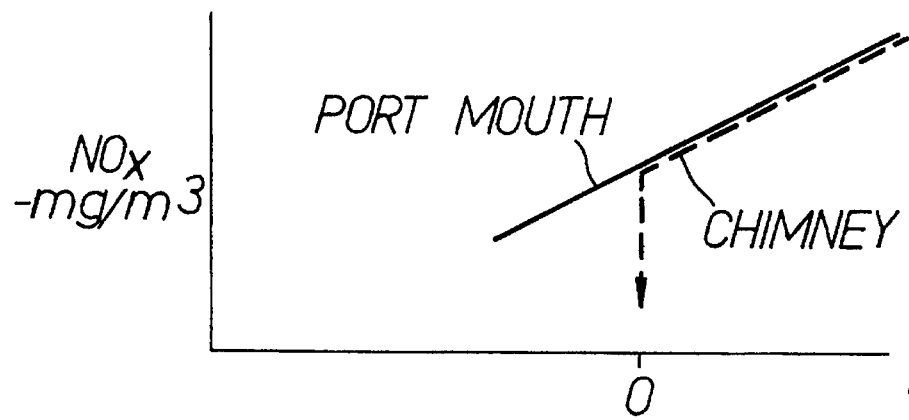

FIG. 4 shows the relationship between NOx concentration at the port mouth (the solid line) and the chimney (the dashed line) and the excess air at the port mouth. It will be seen that working at stoichiometric conditions, the NOx concentration in the chimney can be reduced by adding increasing amounts of post combustion fuel which causes NOx reduction to occur in the checkerwork structure resulting in reduced NOx concentrations in the chimney gases. In order to initiate the de-NOx reaction over the regenerators, at least 3% excess fuel, as a percentage of the primary fuel is added, and preferably around 8 to 10% excess fuel is added. The advantage of the Type 2 operation is that no substantial alterations to the glass furnace are required, apart from the provision of additional equipment to inject the added fuel on the non-firing side. In fact, the Type 2 operation can be operated with a limited amount of excess air in the melting tank. In addition, the Type 2 operation is generally suitable for special glasses such as some tinted glasses where it is not appropriate to work at substoichiometric conditions in the melting tank.

Figure 5:
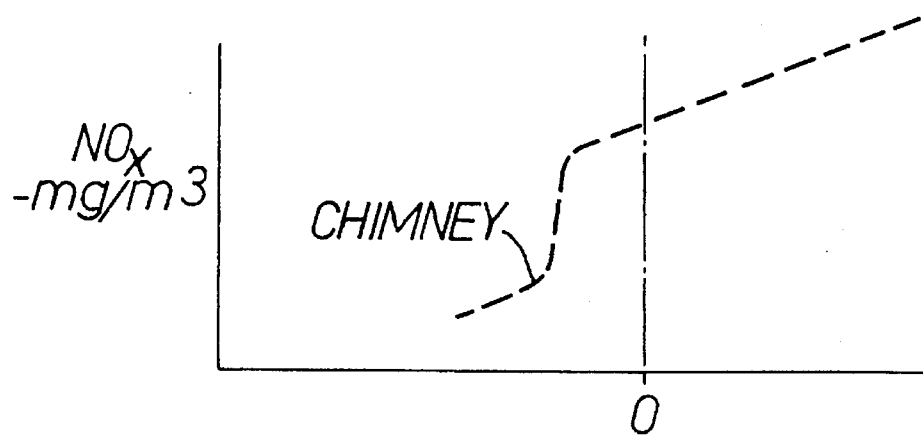

It is also possible to operate the furnace to achieve NOx reduction by using hybrid Type 1 and Type 2 conditions. In such operation, the furnace is operated at substoichiometric conditions, with preferably at most −2% excess air, desirably even less air, at the exit port mouth, and excess fuel, preferably at least 3% excess fuel, is injected into the waste gases on the non-firing side. FIG. 5 shows the relationship between the NOx concentration in the chimney flue with respect to excess air at the checkertop the (top of the checkerwork structure) with a fuel addition on the non-firing side. It will be seen that at around −2% excess air and with a fuel addition the NOx concentration is greatly reduced.

In another embodiment of the present invention, the glass melting furnace is of the kind in which the thermal firing of the furnace is reduced by providing heat by electro-thermal means at the filling end of the furnace.

In both Type 1 and Type 2 operation, and also in the hybrid Type 1/2 operation, the increased levels of raw fuel input required to reduce NOx are typically 5 to 15% in excess of that normally used to produce glass at the desired rate and quality.

To minimize the financial penalty from the increase in fuel required in the glass melting furnace, to reduce NOx, we can operate in such a way as to offset the increased fuel costs, by improving the overall thermal efficiency of the glass melting furnace by, for example, adding steam to the combustion air being supplied to the furnace.

The addition of steam typically at a level of about 6%, by volume, of the stoichiometric volume of air supplied to the furnace for combustion, (all volumes normalized to 0° C., 760 mm Hg) can improve the thermal efficiency of the glass melting furnace by 5%. Air preheat is enhanced by increasing the radiative heat transfer between the checkerwork and, more importantly, the upper chamber of the regenerator structure by increasing the quantity of the gaseous species present in the combustion air which are receptive to radiant heat.

The increase in the available heat content of the waste gases, which is derived from the 5 to 15% increase in fuel burnt on the furnace required for reducing NOx can be used directly to generate steam for this or other purposes.

A 5000 metricton/week furnace at 60 net Therms/metricton incorporated substoichiometric running or after burners for deNOx, with a thermal input of 10% of the usual melting furnace requirement, increasing thermal input to an equivalent 66 Therms/metricton. The addition of steam at the 5% level (normalized to 760 mm Hg and 0° C. ), improves the thermal efficiency of the process by 3 Therms/metricton, giving a final running consumption of 63 net Therms/metricton.

The effect of the de-NOx operations in accordance with the present invention on furnace operation and on other emissions was also investigated. The addition of post-furnace fuel did not have any long term effect on the $SO_2$ emmission from the furnace and no traces of $H_2S$, HCN or $NH_3$ were found in the waste gases measured at the chimney.

In addition, the addition of post-furnace fuel did not affect the composition of the dust recovered from the electrostatic precipitator connected to the chimney flue.

The present inventors also monitored the carbon monoxide emissions from the chimney of the glass melting furnace. Using sealed regenerators which supplied little inleakage of air into the upper chamber or the checkerwork structures and with the furnace operated stoichiometrically or substoichiometrically, some fuel added at the port mouth will still be present at the rider arch of the furnace i.e. downstream of the regenerator, as unburnt gases. The unburnt gases need to be burnt before being emitted from the chimney and the unburnt gases are a complex mixture of species, of which typically about 70% is present as carbon monoxide with the remainder being primarily hydrogen. In addition the added fuel could produce up to 30% or more combustibles, as carbon monoxide, than will be expected from its simple breakdown by combustion. It is necessary for sufficient air to be added to the waste gases downstream of the checkerwork structure in order for complete combustion to occur so as to oxidize the carbon monoxide and other combustibles. Such air may be present as a result of natural inleakage or it may be added to the waste gases downstream of the checkerwork structure. It is necessary, once sufficient air is present, for the temperature to be high enough for oxidation to occur at a reasonable rate. The burning of carbon monoxide and other combustible species in the regenerator base and flues is accompanied by the release of heat giving increased waste gas temperatures, assuming that inleakage of cold air is not excessive. By way of illustration and example, the present inventors discovered that carbon monoxide emissions in the chimney gases were reduced to or below normal levels provided that the temperature in the regenerator base and flue areas was above about 650° C. and there was sufficient air present to complete combustion of the combustibles. The present inventors have surprisingly found that provided that the temperature in the regenerator base and flue areas was above 650° C., the de-CO reaction was initiated and then proceeded in the central flue of the furnace which has a long residence time of gases therein which ensures complete CO removal. Acceptably low CO levels in the chimney emissions could be achieved by using a burner or burners (i.e. a burner as shown by reference numeral 27 in FIG. 1) for supplying heated air in the regenerator base which raised the temperatures towards around 700° C. It was found that simple addition of extra unheated air at the rider arch, or even at positions higher up the checkerwork, was not sufficient to achieve effective carbon monoxide burnout in the lower regenerator chamber and bridging flues because the temperatures were too low, i.e. below the threshold value of around 650° C. When the furnace was operated with post furnace fuel on all ports, low CO levels, of around 180 ppm in the chimney, were achieved due to vigorous combustion taking place in the main flue ensuring that all the waste gases reach the critical temperature of around 650° C., as the indicated main flue temperature rose to 680° C. Such higher flue temperatures can readily be accommodated in the melting furnace provided that the main flue refractory lining has a temperature design limit greater than that achieved by the CO combustion in the main flue. Furthermore, if a waste heat boiler is provided in the chimney flue, the pre-set boiler inlet temperature may need to be raised or the boiler inlet may need to be bypassed so that the heat capacity of the boiler is not exceeded. Furthermore, it may be necessary to cool the waste gases prior to their being passed through the pollution treatment plant and the electrostatic precipitator. This may be achieved by water sprays and/or extra air dilution. In order to ensure sufficient air for complete combustion of the CO in the regenerator base and flue areas, deliberate inleaking of air at a suitable position can be provided.

Figure 6:
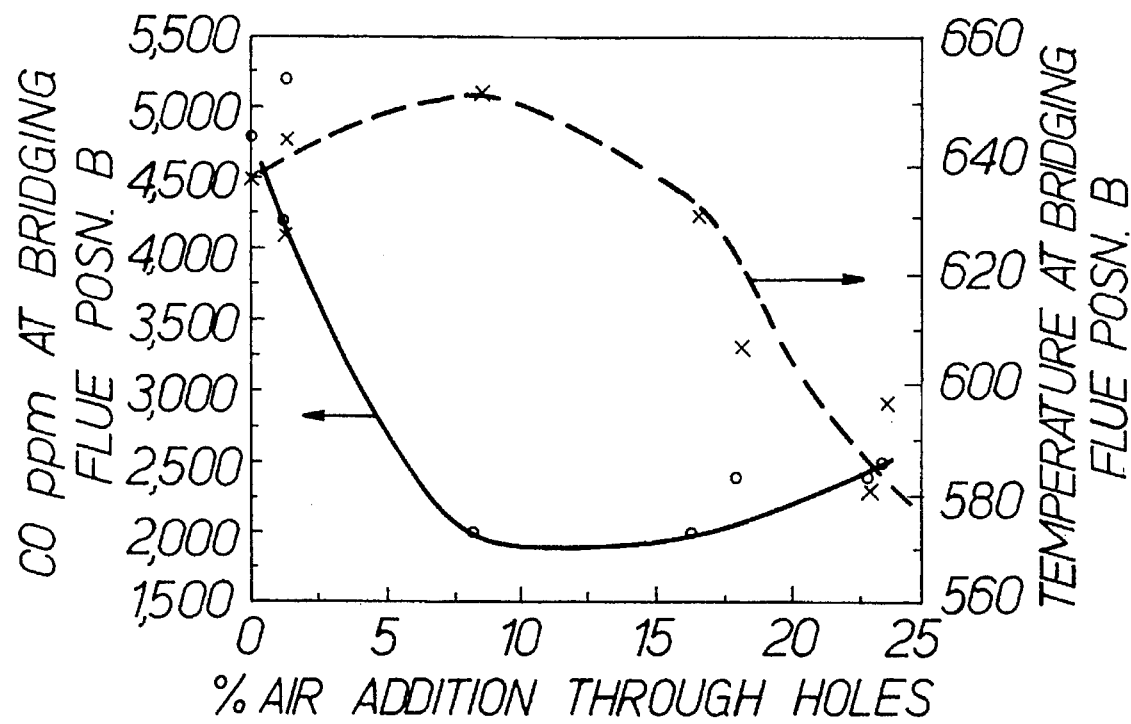

The present inventors have determined that the ideal position in the regenerator system to achieve burnout of CO and of other combustibles, is in the lower chamber below the rider arch. The present inventors have determined that maximum CO burnout occurred at around 8% inleaked air which reduced the CO level down to about 2000 ppm. FIG. 6 shows the relationship between the CO level with respect to air addition (the solid line) and between the temperature and the air addition (the dashed line), at the second port rider arch of the furnace shown in FIGS. 1 and 2, the CO level and the temperature being measured at substantially the center of the bridging flue at position B. Prior to inleakage of air, there was about 3 to 6% of unburnt gases at the rider arch and the temperature of the waste gases was less than 650° C. so that the temperature and oxygen content were too low to initiate CO removal. Air leakage was permitted into the lower chamber at the second port through the cleanout holes just above the rider arch level and this reduced the concentration of CO at the rider arch which was about 25000–30000 ppm, with about 5000 ppm CO at the bridging flue position B, to around 2000 ppm at the bridging flue position B. As may be seen from FIG. 6, an increase in the inleaking air increased the burnout of the CO until maximum de-CO occured at about 8% air addition, yielding a CO amount of around 2000 ppm. Above this level of air inleakage, further carbon monoxide burnout was not achieved. With increasing air addition, the temperature increased to a maximum of around 650° C., also at a percentage air addition of about 8%. The waste gas temperatures rose up to about this percentage inleakage value but then gradually dropped with higher levels of inleakage. This shows that above a certain inleakage level, the inleakage effectively cooled the waste gases, inhibiting the oxidation of CO. Visual inspection of the flue showed pale blue wispy flames, indicating CO oxidation, originating at or just below the rider arches and continuing to the flue and at the clean out hole where the inleaked air met the waste gases. The results shown in FIG. 6 indicate that effective carbon monoxide burnout can be achieved at inleakage air values of around 8% and at a temperature above about 650° C.

In order to achieve improved carbon monoxide burnout, the temperature of the air/CO mix was increased beneath the rider arch by addition of heat at that point. The temperature may also be increased by moving the flue dampers in the regenerator system. A natural gas-fired high excess air burner, capable of supplying air at a temperature of up to 900° C., was, in this Example, located on only one port of the furnace shown in FIG. 1. This burner supplied air at above about 800° C. and at a rate of approximately 50 $m^3$/hour of burner gas, equivalent to about 6% of the port fuel. The temperature of the waste gases was raised by about 20° to 30° C. This enabled a level of CO of less than 300 $mg/m^3$ to be achieved at the bridging flue position B as shown in FIG. 1 because of increased CO removal.

Figure 7:
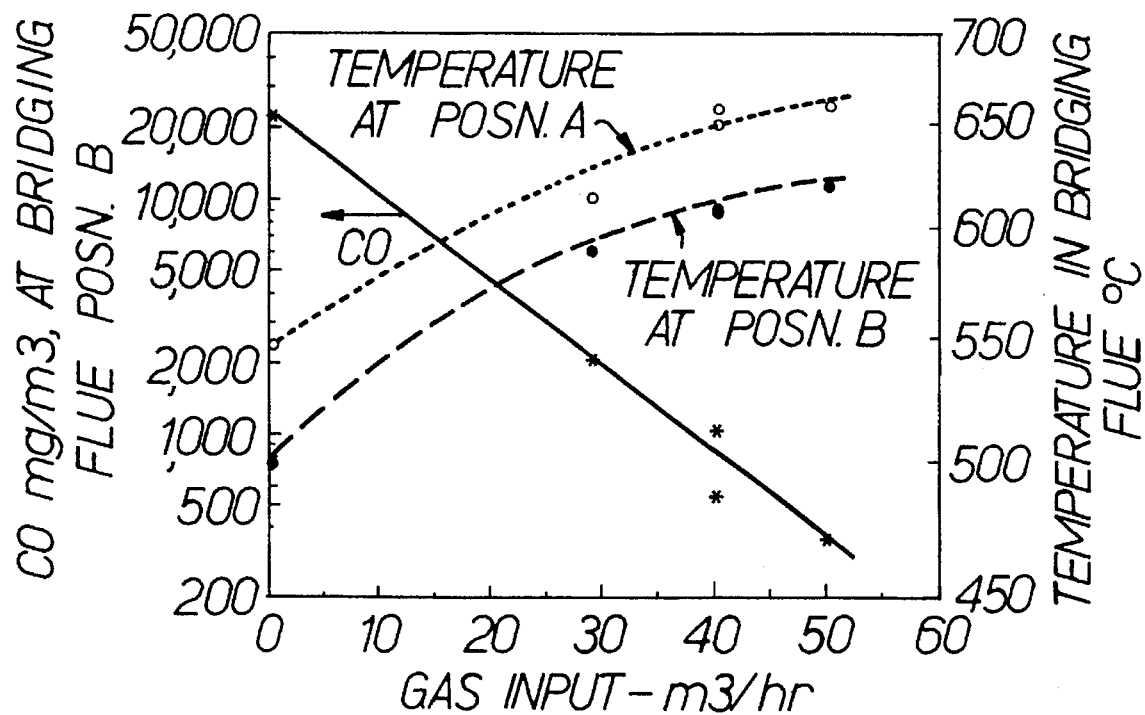

FIG. 7 illustrates the relationship between the CO amount and the natural gas input of the burner (the solid line) and the relationship between the temperature in the bridging positions A and B (the dashed lines) with the natural gas input. It will be seen that as the gas input of the burner increases, the temperature at positions A and B respectively increase and the CO concentration rapidly decreases. In addition, as the gas input increases, the excess air below the rider arch also increases because the burner is supplying heated air. It will be seen at position A that at a temperature of around 650° C. the CO level is reduced to around 800 $mg/m^3$.

In Type 2 operation of the method of the present invention, when post furnace fuel is added to the ports, an increase in the waste gas temperatures was detected and this was accompanied by the existence of flames at the rider arch indicating spontaneous combustion with the excess, but naturally inleaking, air. Such combustion can cause some oxidation of the carbon monoxide present in the combustion products. When the waste gas temperature in the main flue achieved a temperature greater than 650° C., extremely good de-CO was achieved and it was noted that combustion was continuing in the main flue past the measuring point. With natural inleakage of air, the average amount of CO in the main flue of all six ports was around 500 ppm, which was reduced to around 180 ppm of CO in the chimney. This may be compared to an original chimney concentration of CO of 250 ppm prior to post furnace fuel addition. Thus the method of the present invention can also obtain a reduction in CO emissions from a glass melting furnace.

It is believed that the oxidative removal of CO at relatively low temperatures of around 650° C. and above is assisted by the presence of $H_2O$ in the waste gases which is a combustion product of the fuel burnt, particularly when the fuel is methane. It is believed that the presence of $H_2O$ in the gases lowers the temperature at which the CO oxidation can occur and the temperature at which maximum CO oxidation can occur.

The present invention can provide significant technical advantages in substantially reducing NOx emissions from flat glass furnaces to less than 500 $mg/m^3$, without significant changes to the furnace operation and structure and without negatively affecting glass quality. Other emissions are readily controlled, e.g. the emission of CO can be controlled down to less than 300 $mg/m^3$ and dust recycling and electrostatic precipitation are not affected. There is a reduction in thermal efficiency because of the increased fuel requirement of up to 15% in order to maintain the quality and production rate of the glass but with reduced NOx emissions. However, because no expensive de-NOx catalytic systems are employed, the method of the present invention can readily and cost-effectively be incorporated into existing glass melting furnaces. The present invention can therefore present a lower capital and lower operating cost alternative to other NOx control techniques, such as selective catalytic reduction (SCR), selective non-catalytic reduction (SNCR) and oxy-fuel techniques in the prior art.

The following examples illustrate but do not limit the invention.

COMPARATIVE EXAMPLE I

A natural gas six port cross-fired glass melting furnace operating at 700 metrictons/day with 20% cullet and a thermal preformance of 58.5 gross Therms/metricton (1474 kCal/kg) was operated with a mean excess air level at the exit port mouths of 3.4%. At the port mouth the average NOx concentration was around 2200 mg/m$^3$, in the main flue, the NOx concentration was around 2100 mg/m$^3$ and in the chimney the NOx concentration was around 2000 mg/m$^3$. The excess air levels were calculated assuming that the total combustibles contain 70% CO, the balance being $H_2$. At the checkertop, the rider arch, the bridging flue, (position A), the bridging flue (position B), the main flue and the chimney the excess air values (all weighted means thereof where appropriate) were 5.2% 5.8% 8.3% 14.3% 16.9% and 28.0% respectively. The waste gas temperatures over the system at the port mouth, the checkertop, the rider arch, the bridging flue (position A), the bridging flue (position B), and the main flue were 1592, 1458, 636,573, 530 and 517° C. respectively. The weighted mean values for the excess air and the fluid temperatures were calculated using the input fuel distribution and ignoring cross flows. At an excess air level of around 3.4%, the amount of unburnt fuel leaving the furnace at the port mouth amounted to around 2.5% of the total fuel supplied. Natural inleakage of air into the regenerator system was low, being around only 2.4% of the stoichiometric air requirement, between the port mouth and the rider arch. However, an additional inleakage of around 11% occurred over the regenerator base and flues.

EXAMPLE I

The baseline values of the furnace of Comparative Example I were modified by employing a Type 1 NOx reduction operation in accordance with the present invention. The excess air on the second port this port being selected because it had the highest fuel flow (22%) and starting NOx levels were measured as being high, was reduced from the baseline of excess air of +4% of the Comparative Example down to −6.3%. The results are shown in Table 1. It will be seen that the provision of a negative amount of excess air at the port mouth substantially reduces the amount of NOx both at the port mouth and in the bridging flue.

Inleakage over the sealed regenerator was low, amounting to 2.4% of the stoichiometric air requirement of the melting furnace. However, 10% inleakage occurred over the regenerator base and flues.

The ideal position over the regenerator system to achieve "burn-out" of the CO, and other combustibles, is in the lower chamber below the rider arch. With 3–6% of unburnt gases at the rider arch, there was not enough natural inleakage of air into the lower chamber to satisfy the primary requirement of sufficient oxygen. Temperatures of the waste gases were in general less than 650° C.

FIG. 6 shows the effect of deliberately allowing air to leak into the lower chamber at the second port through the clean out holes just above rider arch level. Initially concentrations of CO at the rider arch were 25000–30000 ppm with 5000 ppm in the bridging flue. Clearly there had been some CO reduction (deCO) occurring over this region although most of the air inleaking naturally (about 10% stoichiometric with respect to main furnace fuel) was later on, and thus had little time to effectively react with the CO.

As air was progressively leaked into the lower chamber at rider arch level, there was an increasing amount of "burning" of the CO until maximum deCO occurred at an extra 8% inleaked air (CO down to 2000 ppm). Above this level of extra inleakage, deCO was not as effective.

An examination of the waste gas temperatures in the bridging flue showed a 10–20° C. rise with the inleakage at up to 8%, but the temperature gradually dropped with higher levels of inleakage. Clearly some inleakage of air was beneficial, but above a certain level, this inleakage was effectively cooling the waste gases, inhibiting the oxidation of CO.

These results indicated that if air at a higher temperature were present better deCO might be achieved.

EXAMPLE II

The baseline measurements of Comparative Example I were modified by the use of a post furnace fuel addition in the second port. The results are shown in Table 2. It will be seen that without any post furnace fuel addition and simply moving to stoichiometric furnace conditions gave a 25 to 30% reduction in furnace NOx levels. Therefore the overall benefits on NOx reduction by post furnace fuel addition may include an element attributable to changes in the furnace stoichiometry. De-NOx was initiated over the regenerators after an addition of at least 4% of post furnace fuel, and significant de-NOx occurred at about 6% post fuel addition. The target value of 500 mg/m$^3$ NOx in the downstream part of the bridging flue at position B (and thus the chimney) was achieved at around 8.5% post furnace fuel addition.

Figure 8:
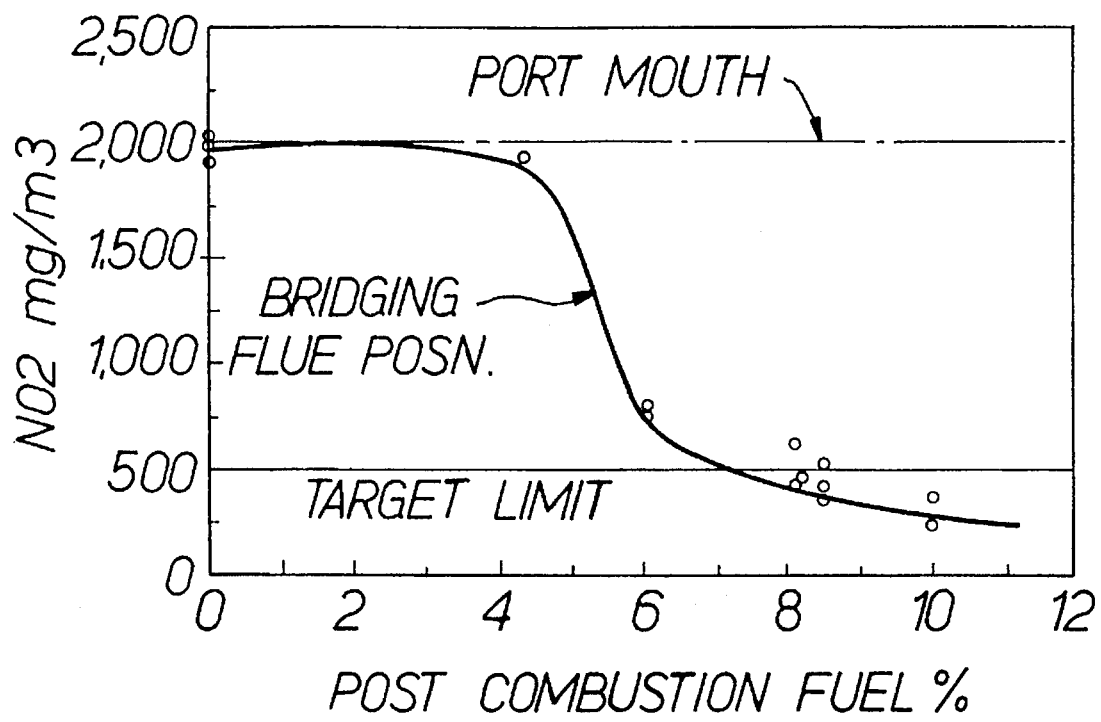

FIG. 8 shows the relationship between the NOx emissions at the second port with varying post combustion fuel additions. It will be seen that in the bridging flue the target limit of 500 mg/m$^3$ NOx emissions is achieved at around 7% post combustion fuel, with the baseline NOx concentration at the port mouth being around 2000 mg/m$^3$. The threshold value of added fuel may be expressed in terms of the equivalent excess air level (with respect to total fuel burn) at the checkertop of approximately −2% (0.8% combustibles, around 6000 ppm of measured CO). However, to achieve the target NOx level the checkertop excess air should be around −7% (2.7% combustibles, around 20000 ppm of measured CO).

Figure 9:
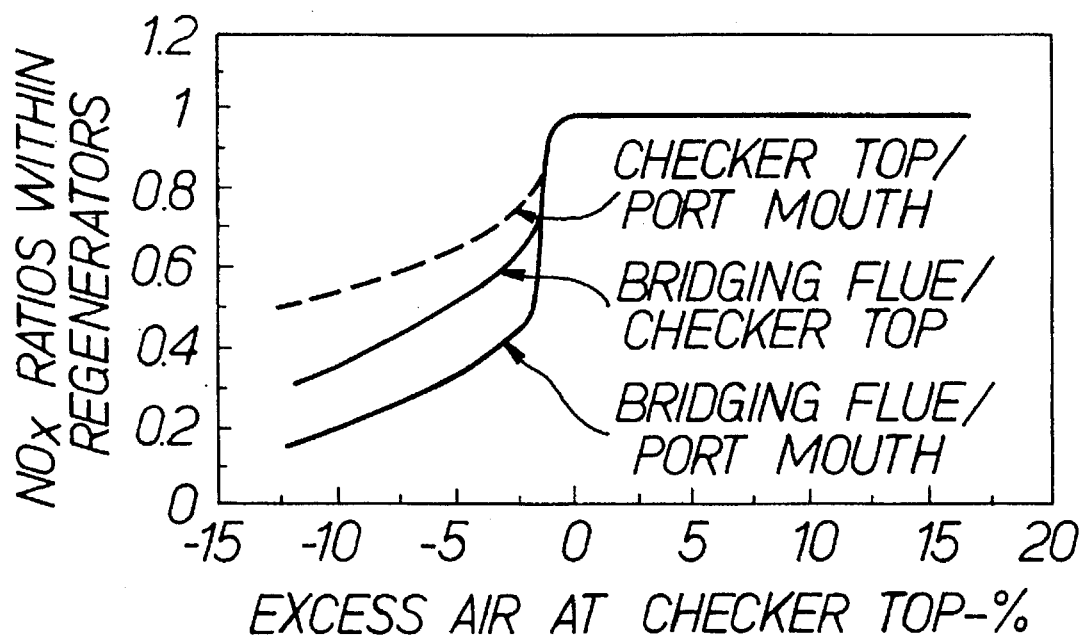
FIG. 9 shows the relationship between the ratio of NOx reduction over various parts of the checkerwork structure with respect to excess air at the checkertop.

Significant de-NOx i.e. up to about 30% was observed between the port mouth and the checkertop in addition to the expected major reduction over the checkerwork structure. The results are shown in FIG. 9 which shows the relationship between the ratio of NOx reduction over the various parts of the checkerwork with respect to excess air at the checkertop. The temperature window over which the deNOx reaction can occur is very wide, ranging from around 600° to 1600° C. consequently giving long reaction times within the regenerator structure. However, this is provided that air inleakage in the upper chamber of the regenerator is low and in sealed regenerators with high inleakage levels, the deNOx reaction in the upper chamber may not be as pronounced and accordingly a high level of added fuel may be required.

In Example I, the attempts to deCO on this furnace with cold air addition indicated that increasing temperatures should improve the CO burnout if sufficient air was present. In order to increase temperatures a high excess air burner was used, capable of supplying air at up to 900° C.

A single burner was tried at separate times on the second port and in each instance a significant reduction of CO was recorded, more particularly when the air supplied was estimated to be above 800° C. (approximately 50 m$^3$/hr of burner gas, equivalent to 6% of the port fuel). Under these conditions the overall temperature of the waste gases was raised by 20°–30° C., and locally probably by more. A visible flame from the burner, seen at the higher temperatures, may have helped initiate the "burnout".

An acceptable level of CO of <300 mg/m$^3$ was achieved in the bridging flue under these conditions. FIG. 7 shows how the deCO and flue temperatures progressed as the level of burner fuel was increased.

EXAMPLE III

The furnace of Comparative Example I was modified by the use of post-furnace combustion fuel on all of the ports. The amount of post-furnace combustion fuel applied to the six ports is shown in Table 3 from which it will be seen that the average percentage post-furnace combustion fuel was 7.75%.

The NOx emissions were measured and the results are shown in Table 4. It will be seen that the use of post furnace fuel achieved NOx emission levels in the chimney of 270 mg/m$^3$, (a reduction of 86% compared to the starting level of 2000 mg/m$^3$ in comparative Example I), this being well below the target level of 500 mg/m$^3$ which would require slightly less post-furnace fuel.

Table 5 shows the comparison of the baseline measurements of the furnace of Comparative Example I with the corresponding results when post furnace fuel is applied to all ports, weighted mean results only being shown. The results show that for all ports, significant deNOx occurs between the port mouth of the checkertop, and between the checkertop and the rider arch. Little or no reduction in NOx occurs beneath the rider arches or in the flues. At the levels of post furnace fuel added, i.e. 7 to 8%, NOx concentrations were all less than 500 mg/m$^3$ at the flue of each port, resulting in an overall chimney emission level of around 300 mg/m$^3$. At the checkertop, a slight reduction in waste gas temperature of around 20° to 30° C. was recorded on most ports despite no significant changes in furnace temperatures. It is believed that the temperature reduction was due to the energy requirement for dissociation of the natural gas with minimal free oxygen present. There was no significant change in the measured combustion air preheat. The slight increase in the mean waste gas temperature at the rider arch was for the most part due to a large rise in the temperature of the second port rider arch due to a significant increase in waste gas volume taken by the second port because of incidental deslagging by the melting and/or dissociation of sodium sulfate which occurred during the trial as a result of experiments aimed at CO burnout in the flue.

As post furnace fuel was added to each port, the temperatures at the bridging flue entrance increased by an average of 30° C.

As expected where combustion was seen to occur, there was a substantial rise in the waste gas temperatures. However, waste gas analysis shows that even on those ports which had strong flames and a high temperature rise, considerable amounts of unburnt gases remained.

As the total post furnace fuel was added progressively to the furnace, the waste gas temperature in the main flue was monitored and showed a steady rise. At first the measured CO levels increased significantly but began to decrease once the main flue temperature approached 650° C. with extremely good deCO above 650° C. At this stage strong burning was observed in the main flue from the "second port" towards the chimney. In fact combustion was still continuing in the main flue past the measuring point with the final CO emission at the chimney of 180 ppm, slightly lower than the starting level of 250 ppm. This was achieved with no deliberate inleakage of air, sufficient air leaking in naturally over the flue system.

These results confirm that, provided there is sufficient oxygen present and the waste gas temperatures reach at least 650° C., and provided there is sufficient residence time, then very good "deCO" is achieved.

In each of Examples I to III the glass quality was not adversely affected. In fact the level of clear bubble, sulfate bubble and inclusions was slightly improved. The SO$_3$ level in the glass was not affected by furnace stoichiometry.

EXAMPLE IV

A natural gas cross-fired furnace with sealed regenerators is operated at an output of 5000 metrictons/week by burning natural gas using side port burners. The combustion air is maintained at a level such that the gas is burnt in the furnace under substantially stoichiometric conditions. The NOx concentration of the waste gases leaving the regenerators when measured at the chimney base is of the order of 2500 mg/m$^3$. NOx concentration is expressed in this Example, and in Example V and VI, as the equivalent mass of NO$_2$ in the wet waste gases. The volume is normalized to 0° C. and 760 mm Hg absolute, and to 8% oxygen content calculated for a dry sample to take into account dilution by air inleakage.

The furnace is also operated so that the excess air present in the furnace rises from −15% at the first port to 0% at the last port, while still feeding sufficient fuel to maintain glass melting rate and glass quality. This ensures that combustible material leaves the melting chamber with the waste gases. The NOx concentration of the waste gases falls by about 90%. Controlled amounts of air are added to the waste gases as they pass out of the regenerators, and any remaining combustibles are substantially burnt out before the waste gases exit to atmosphere.

EXAMPLE V

An LPG (liquid petroleum gas), 8 ports cross-fired furnace with sealed regenerators is operated at an output of 5700 metrictons/week by burning LPG as gas using side port burners, producing float quality glass. The combustion air is maintained so that the weighted excess air level at the exit port mouth is 4.8% (i.e. excess air weighted to the fuel supply port by port—see table below), the NOx levels at the port neck and the chimney base are of the order of 2000 mg/m$^3$. The furnace is also operated so that the weighted excess air in the furnace falls from 4.8% to −2.5%, while still feeding sufficient fuel to maintain glass melting rate and quality, and NOx falls to a level of the order 1200 mg/m$^3$—a reduction of 40%. Further air is added to the waste gases containing combustibles as they leave the regenerators, and any combustibles are substantially combusted before the waste gases exit to atmosphere.

Table 6 shows the % excess air at each port mouth, when operating both with positive excess air and negative excess air i.e. substoichiometric and the overall average conditions. The quantity of NOx measured at the chimney base is given.

EXAMPLE VI

A five port, crossfired furnace with sealed regenerators, burning natural gas using side port burners, operated at an output of 1400 metrictons per week and 1.5 MW of electric boost, producing float glass.

The combustion air is maintained so that the weighted excess air at the exit port mouth is 3.0%, and the levels of NOx are of the order 2150 mg/m$^3$. The furnace is also operated so that the weighted excess air in the furnace falls to −7.5%, thus ensuring combustible material in the waste gases.

The NOx at the chimney base falls to about 400 mg/m$^3$ (wet) at 8% O$_2$ (dry)—a reduction of greater than 80%. Table 7 shows the results of working in both manners.

TABLE 1

NOx concentrations through regenerator system at the Second Port with Excess (XS) Air Level at port mouth

|  | Baseline | Reduced Excess Air | |
|---|---|---|---|
| Port Mouth XS Air % | 4.0 | −2.4 | −6.3 |
| NOx - mg/m$^3$ |  |  |  |
| Port Mouth | 2790 | 1580 | 1500 |
| Checker Top | 2770 | 1640 | N/A |
| Bridging Flue Posn. B | 2750 | 1500 | 883 |

TABLE 2

NOx Concentrations at the Second Port

|  | Base | | Post Furnace Fuel | | | | |
|---|---|---|---|---|---|---|---|
| Post Furnace Fuel % | 0 | 0 | 4.3 | 6.0 | 8.1 | 8.5 | 10 |
| Port Mouth XS Air % | 4.0 | 0.1 | N/A | −2.5 | 0.5 | −0.6 | −1.0 |
| NOx mg/m$^3$ |  |  |  |  |  |  |  |
| Port Mouth | 2790 | 2000 | N/A | 1790 | 1930 | 1750 | 2050 |
| Checker Top | 2770 | 2000 | 1880 | 1270 | 1130 | 1100 | 880 |
| Rider Arch Bridging Flue | 2660 | 1920 | 1760 | 840 | 730 | 625 | 300 |
| Posn A | 2800 | 2110 | 1920 | 810 | 660 | 560 | 230 |
| Posn B | 2750 | 1890 | 1910 | 730 | 600 | 510 | 230 |

TABLE 3

Fuel Levels

|  | Ports | | | | | | |
|---|---|---|---|---|---|---|---|
|  | 1 | 2 | 3 | 4 | 5 | 6 | Total |
| Main Fuel nm$^3$/hr | 998 | 1022 | 836 | 465 | 580 | 739 | 4640 |
| % Main Fuel | 21.5 | 22.0 | 18.0 | 10.0 | 12.5 | 16.0 | 100 |
| Post furnace fuel m$^3$/hr | 80 | 83 | 58 | 32 | 47 | 60 | 360 |
| % Post furnace Fuel | 8.0 | 8.1 | 6.9 | 6.9 | 8.1 | 8.1 | 7.75 |

TABLE 4

NOx Concentrations (mg/m$^3$) Throughout System

|  | Ports | | | | | | Weighted |
|---|---|---|---|---|---|---|---|
|  | 1 | 2 | 3 | 4 | 5 | 6 | Mean |
| Port Mouth | 1170 | 1320 | 1160 | 1470 | 1520 | 2050 | 1410 |
| Checker Top | 570 | 920 | 740 | 900 | 860 | 1160 | 840 |
| Rider Arch Bridging Flue | 230 | 430 | 330 | 370 | 70 | 330 | 305 |
| Posn A | 370 | 620 | 520 | 350 | 140 | 480 | 440 |
| Posn B | 250 | 490 | 410 | 410 | 80 | 500 | 370 |
| Main Flue |  |  |  |  |  |  | 310 |
| Chimney |  |  |  |  |  |  | 270 |

TABLE 5

Comparison of Baseline Measurements and those with Fuel on all Ports
(weighted mean results only)

|  | Port Mouth | Checker Top | Rider Arch | Bridging Flue Posn A | Bridging Flue Posn B | Main Flue | Chimney |
|---|---|---|---|---|---|---|---|
| Excess Air, % | | | | | | | |
| Baseline | +3.4 | +5.2 | +5.8 | +8.3 | +14.3 | +16.9 | +28.0 |
| All ports p-f fuel | −0.7 | −7.9 | −4.7 | −1.8 | 0.6 | +5.6 | +35.4 |
| Carbon Monoxide, ppm (combustibles, %) | | | | | | | |
| Baseline | (1.30) | 2270 | 720 | 1140 | 670 | 700 | 610 |
| All ports p-f fuel | (2.01) | 29100 | 24100 | 15300 | 11800 | 500 | 180 |
| Waste Gas Temperature, °C. | | | | | | | |
| Baseline | 1592 | 1458 | 636 | 573 | 530 | 517 | — |
| All ports p-f fuel | — | 1436 | 659 | — | 607 | 670 | — |
| NOx Emissions, mg/m³ | | | | | | | |
| Baseline | 2190 | 2140 | 2030 | 2170 | 2180 | 2100 | 2010 |
| All ports p-f fuel | 1410 | 840 | 305 | 440 | 370 | 310 | 270 |
| % reduction - compared with baseline p.mouth | 36 | 61 | 85 | 80 | 83 | 85 | 86 |
| relative % reduction | | 40 | 64 | 0 | 0 | 0 | 0 |

TABLE 6

| Port | % Excess air at port mouth | % Excess air at port mouth |
|---|---|---|
| 1 | 0.5 | −8.3 |
| 2 | 10.3 | −10.6 |
| 3 | −0.7 | −9.6 |
| 4 | 4.4 | −4.2 |
| 5 | 11.4 | 3.1 |
| 6 | 3.7 | 6.3 |
| 7 | 4.1 | 15.1 |
| 8 | 8.7 | 15.9 |
| Weighted average | 4.8 | −2.5 |
| NOx (mg/m³) at chimney | 2000 | 1200 |

TABLE 7

| Port | % Excess air at port mouth | % Excess air at port mouth |
|---|---|---|
| 1 | 2.3 | ≦−10.0 |
| 2 | 2.3 | −8.0 |
| 3 | −0.7 | ≦−10.0 |
| 4 | 3.0 | −7.4 |
| 5 | 7.7 | −1.2 |
| Weighted average | 3.0 | −7.5 |
| NOx (mg/m³) at chimney | 2150 | 400 |

EXAMPLE VII

An 'after burner' was incorporated into the third port of this furnace The % excess air there was about 0.5%.

The NOx at the checker top and rider arch was of the order of 2000 mg/m³. By adding an amount of fuel in the waste gas port, of the order of 8% of that supplied to the 'air side' port, a significant reduction in NOx was produced from this port.

Levels of NOx at the rider arch fell to 400 mg/m³ on this port.

The processes of the present invention are believed to be applicable to all flat glass furnaces. It is our belief that the quality of the glass produced is not adversely affected by utilizing the process of the present invention.

Although methods of the present invention have been shown to reduce NOx emissions to low levels, even below 500 mg/m³, this has only been achieved on an experimetal test basis.

It will be apparent that there is no standardized definition of the quality of flat glass. Different manufacturers and end users will have different quality requirements for their products. The use of the processes of the present invention will, it is believed, have no adverse effect on any such quality requirements.

What we claim is:

1. A method of operating a cross-fired regenerative glass furnace for the manufacture of flat glass so as to minimize emission of NOx in waste gases leaving the furnace, the furnace including a melting chamber and including sealed regenerators which act as heat exchangers, the method comprising melting glass in the melting chamber, to which fuel and combustion air are supplied, under substantially stoichiometric conditions, and supplying excess fuel to the waste gases as they leave the melting chamber and enter the sealed regenerators such that waste gases in the sealed regenerators contain combustible material available to react with NOx in the waste gases, and thereafter reacting said combustible material with sufficient air to ensure that the waste gases leaving the furnace through the regenerators and exiting to atmosphere contain permissible levels of combustible material and contain permissible levels of NOx.

2. A method according to claim 1 wherein the excess fuel supplied to the waste gases is in an amount greater than at least 3% of the amount of fuel supplied to the melting chamber.

3. A method according to claim 2 wherein the excess fuel supplied to the waste gases is in an amount in the range from 8 to 10% of the amount of fuel supplied to the melting chamber.

4. A method according to claim 1 wherein the excess fuel is supplied to the waste gases by additional burners located in port mouths of the furnace.

5. A method according to claim 1 wherein the excess fuel is supplied to the waste gases by burners which, in a reverse cycle, supply fuel to the melting chamber of the furnace.

6. A method according to claim 1 wherein the regenerators include a checkerwork structure and excess air is permitted to enter the regenerators downstream of the checkerwork structure so as to ensure substantially complete combustion of the excess fuel in the waste gases.

7. A method according to claim 1 wherein the NOx levels in the waste gases exiting to atmosphere are less than 500 mg/m$^3$ measured under TALuft conditions.

8. A method according to claim 1 wherein the regenerators include a checkerwork structure and further comprising removing CO from the waste gases by combusting CO downstream of the checkerwork structure in the regenerators at a temperature of greater than about 650° C.

9. A method according to claim 8 wherein air is present downstream of the checkerwork structure in an amount sufficient to cause substantially complete combustion of the CO.

10. A method according to claim 8 wherein air is supplied into the regenerator beneath the checkerwork structure.

11. A method according to claim 8 wherein CO emissions in the waste gases exiting to atmosphere are less than 300 mg/m$^3$ measured under TALuft conditions.

* * * * *

UNITED STATES PATENT AND TRADEMARK OFFICE
CERTIFICATE OF CORRECTION

PATENT NO. : 5,569,312
DATED : October 29, 1996
INVENTOR(S) : Richard Quirk, et. al.

It is certified that error appears in the above-indentified patent and that said Letters Patent is hereby corrected as shown below:

Column 5, line 49, after "by" insert --X--;

Column 5, line 56, after "at" insert --Y--; and

Column 5, line 58, after "by" insert --Z--.

Signed and Sealed this

Third Day of June, 1997

*Attest:*

BRUCE LEHMAN

*Attesting Officer*     *Commissioner of Patents and Trademarks*